(12) United States Patent
Slor et al.

(10) Patent No.: US 7,598,688 B2
(45) Date of Patent: Oct. 6, 2009

(54) TILTING DEVICE

(75) Inventors: Yechiel Slor, Givati (IL); Arkady Bronfman, Beer-Sheva (IL); Roni Tzubery, Ramat Gan (IL); Dan Zemer, Rehovot (IL)

(73) Assignee: Orbotech Ltd, Yavne (IL)

( * ) Notice: Subject to any disclaimer, the term of this patent is extended or adjusted under 35 U.S.C. 154(b) by 494 days.

(21) Appl. No.: 11/472,325

(22) Filed: Jun. 22, 2006

(65) Prior Publication Data

US 2008/0028816 A1   Feb. 7, 2008

(51) Int. Cl.
*H02P 1/00*   (2006.01)
(52) U.S. Cl. ............... 318/119; 318/135; 318/630; 318/632; 359/198
(58) Field of Classification Search ......... 318/560, 318/561, 630, 632, 119, 135; 355/72; 359/198, 359/244
See application file for complete search history.

(56) References Cited

U.S. PATENT DOCUMENTS

| | | | |
|---|---|---|---|
| 3,587,335 A | 6/1971 | Howland | |
| 6,188,502 B1 * | 2/2001 | Aoki | 359/198 |
| 6,445,481 B2 * | 9/2002 | Aoki | 359/198 |
| 6,538,802 B2 | 3/2003 | Wang et al. | |
| 6,829,069 B2 | 12/2004 | Buzzetta | |
| 6,856,437 B2 | 2/2005 | Witt et al. | |
| 6,900,918 B2 | 5/2005 | Orcutt et al. | |
| 6,919,980 B2 | 7/2005 | Miyajima et al. | |
| 6,924,914 B2 | 8/2005 | Kato et al. | |
| 7,061,660 B1 | 6/2006 | Chen et al. | |
| 2001/0000130 A1 * | 4/2001 | Aoki | 359/198 |
| 2001/0021058 A1 | 9/2001 | McClelland et al. | |
| 2002/0034024 A1 | 3/2002 | Orcutt et al. | |
| 2002/0067534 A1 | 6/2002 | Holl et al. | |
| 2002/0093721 A1 | 7/2002 | Knipe | |
| 2003/0007226 A1 | 1/2003 | Buzzetta | |
| 2003/0039016 A1 | 2/2003 | Vaganov | |
| 2003/0137716 A1 | 7/2003 | Andosca et al. | |
| 2004/0004775 A1 | 1/2004 | Turner et al. | |
| 2004/0021924 A1 | 2/2004 | Yasuda | |
| 2004/0061960 A1 | 4/2004 | Heaton | |
| 2004/0061961 A1 | 4/2004 | Valette | |
| 2005/0012920 A1 * | 1/2005 | Jeanne et al. | 355/72 |
| 2005/0078346 A1 | 4/2005 | Turner et al. | |
| 2007/0139752 A1 | 6/2007 | Bernstein et al. | |

* cited by examiner

*Primary Examiner*—Paul Ip
(74) *Attorney, Agent, or Firm*—Sughrue Mion, PLLC

(57) ABSTRACT

A flat surface tilting device including a selectably positionable flat surface element assembly defining a flat surface element having a flat surface and a pivot location portion, the pivot location portion being generally centered with respect to the flat surface, a pivot support element pivotably engaging the pivot location portion, an electromagnet, fixed with respect to the pivot support element and arranged for application of magnetic force in a direction generally perpendicular to the flat surface thereby to pivot the flat surface element about the pivot support element, a sensor for sensing the position of the flat surface element and feedback circuitry operative in response to an output of the sensor to govern operation of the electromagnet.

20 Claims, 12 Drawing Sheets

TILTING DEVICE

FIELD OF THE INVENTION

The present invention relates to tilting devices generally, and specifically to three-dimensional positioners.

BACKGROUND OF THE INVENTION

Tilting devices are employed in various applications. One typical application for a tilting device, although not the only application, is a fast steering mirror employed to quickly change the direction at which laser beams impinging thereon are deflected.

SUMMARY OF THE INVENTION

The present inventions seeks to provide an improved tilting device.

There is thus provided in accordance with an embodiment of the present invention a low-inertia flat surface tilting device having a selectably positionable flat surface element assembly having a flat surface element defining a flat surface and having a pivot location portion, the pivot location portion being generally centered with respect to the flat surface, a pivot support element pivotably engaging the pivot location portion, at least one electromagnet, fixed with respect to the pivot support element and arranged for application of magnetic force in a direction generally perpendicular to the flat surface thereby to pivot the flat surface element about the pivot support element, at least one sensor for sensing the position of the flat surface element and feedback circuitry operative in response to at least one output of the at least one sensor to govern operation of the at least one electromagnet.

Embodiments of the invention may include in the alternative one, or more, or none, of the following features:

The pivot location portion includes a recess in the flat surface element;

The pivot support element includes a shaft having a pivot point;

The pivot point has a generally spherical configuration.

The device includes a rotationally retaining magnet mounted onto an underside of the flat surface element which is magnetized in a manner which acts against rotation of the flat surface element about the pivot point. The rotationally retaining magnet includes, for example, a ring-shaped magnet;

The device includes at least one compression spring mounted onto the shaft and anchored to the flat surface element. The at least one compression spring is operative to prevent the flat surface element from rotating about the pivot point.

The pivot support element includes a first pair of spheres arranged along a first axis extending perpendicularly to the direction. The first pair of spheres may be in mutual touching, or non-touching arrangement.

The pivot location portion includes a second pair of spheres mounted onto an underside of the flat surface element, the second pair of spheres pivotably engaging the first pair of spheres and being arranged along a second axis extending generally perpendicular to the first axis and to the direction. The second pair of may be are in mutual touching arrangement, or non-touching arrangement.

At least one of the first pair of spheres and the second pair of spheres is formed of tungsten carbide.

The device also includes a retaining magnet, for example an annular magnet, which is operative to retain the flat surface element in pivotable engagement with the pivot support element.

The at least one electromagnet includes a plurality of electromagnets symmetrically distributed with respect to the pivot location portion.

The device includes at least one spring located opposite the at least one electromagnet with respect to the pivot location portion.

The at least one sensor includes a capacitive sensor.

Feedback circuitry controls tilting of the flat surface element about a single axis, thereby effecting a two-dimensional position of the flat surface element. Additionally or alternatively, the feedback circuitry controls tilting of the flat surface element about at least two axes, thereby effecting a three-dimensional position of the flat surface element.

The feedback circuitry includes first control circuitry operative to control positioning of the flat surface element about a first positioning axis, and second control circuitry operative to control positioning of the flat surface element about a second positioning axis which extends perpendicular to the first positioning axis.

The flat surface element includes a base for a mirror element.

There is also provided in accordance with another embodiment of the present invention a low-inertia flat surface tilting device including a selectably positionable flat surface element assembly including a flat surface element having a flat surface and a pivot location element including a first pair of spheres arranged along a first axis which extends parallel to the flat surface, the first pair of spheres being generally centered with respect to the flat surface, a pivot support element formed of a second pair of spheres arranged along a second axis which extends perpendicular to the first axis, the second pair of spheres pivotably engaging the first pair of spheres, at least one electromagnet, fixed with respect to the pivot support element and arranged for application of magnetic force to the flat surface thereby to pivot the flat surface element about the pivot support element, at least one sensor for sensing the position of the flat surface element and feedback circuitry operative in response to at least one output of the at least one sensor for governing operation of the at least one electromagnet.

This embodiment of the invention includes, alternatively and additionally, one or more or none of the features detailed hereinabove.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
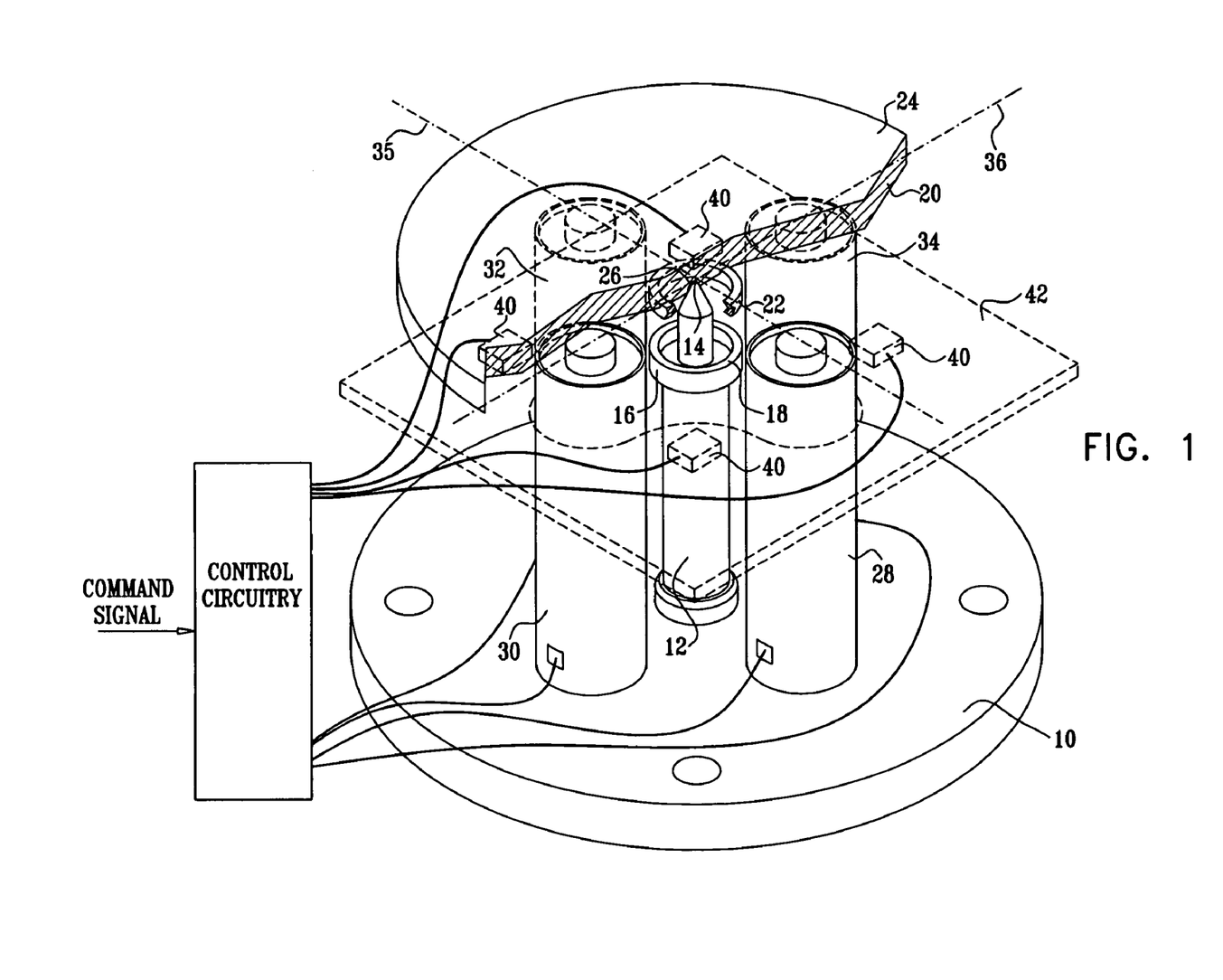
FIG. 1 is a simplified, partially cut-away pictorial illustration of a tilting device constructed and operative in accordance with an embodiment of the present invention.
Figure 2A:
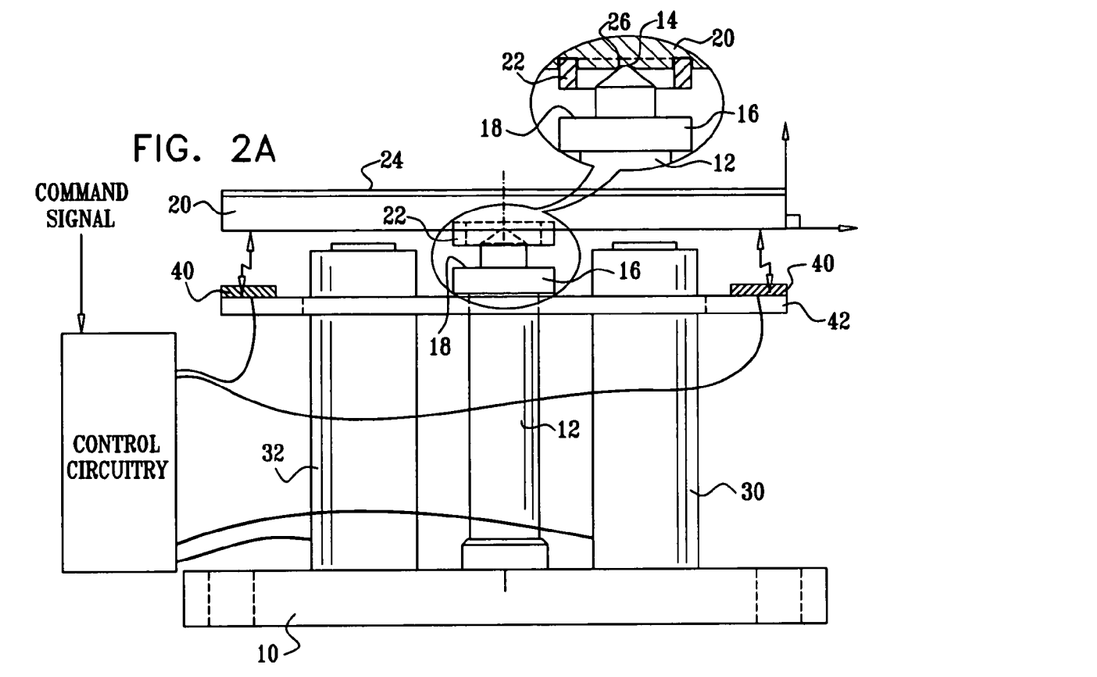
FIGS. 2A, 2B and 2C are respective side view illustrations of the tilting device of FIG. 1 in respective intermediate orientation, first extreme orientation and second extreme orientation.
Figure 2B:
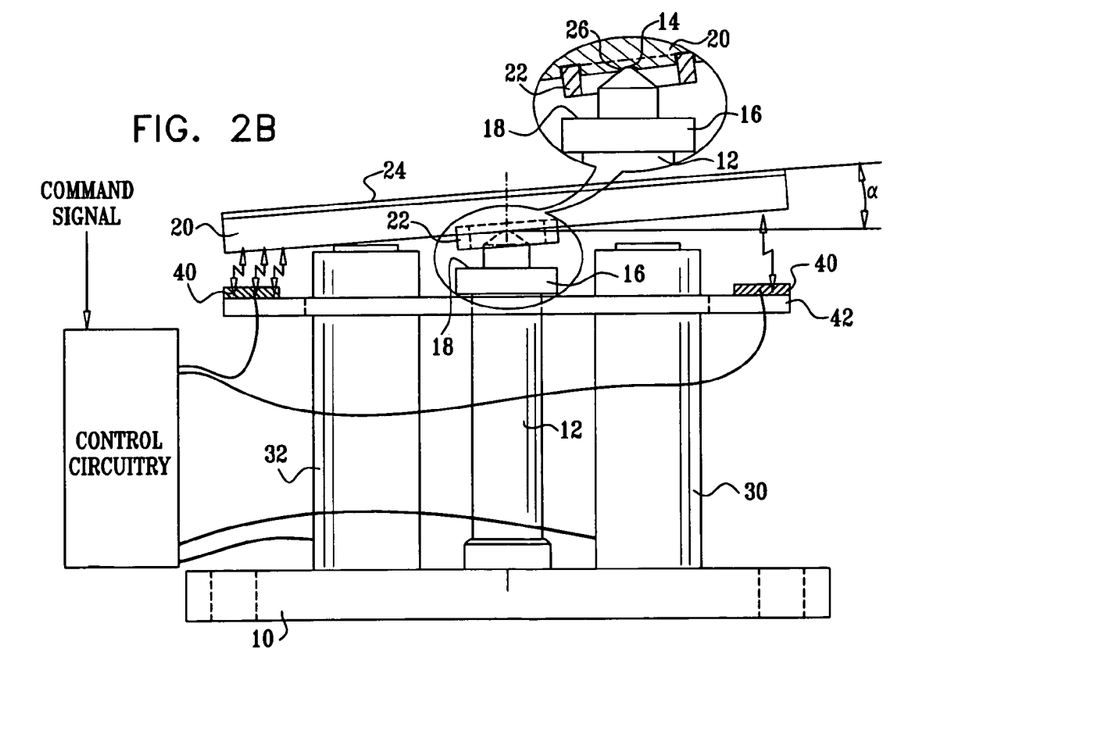
Figure 2C:
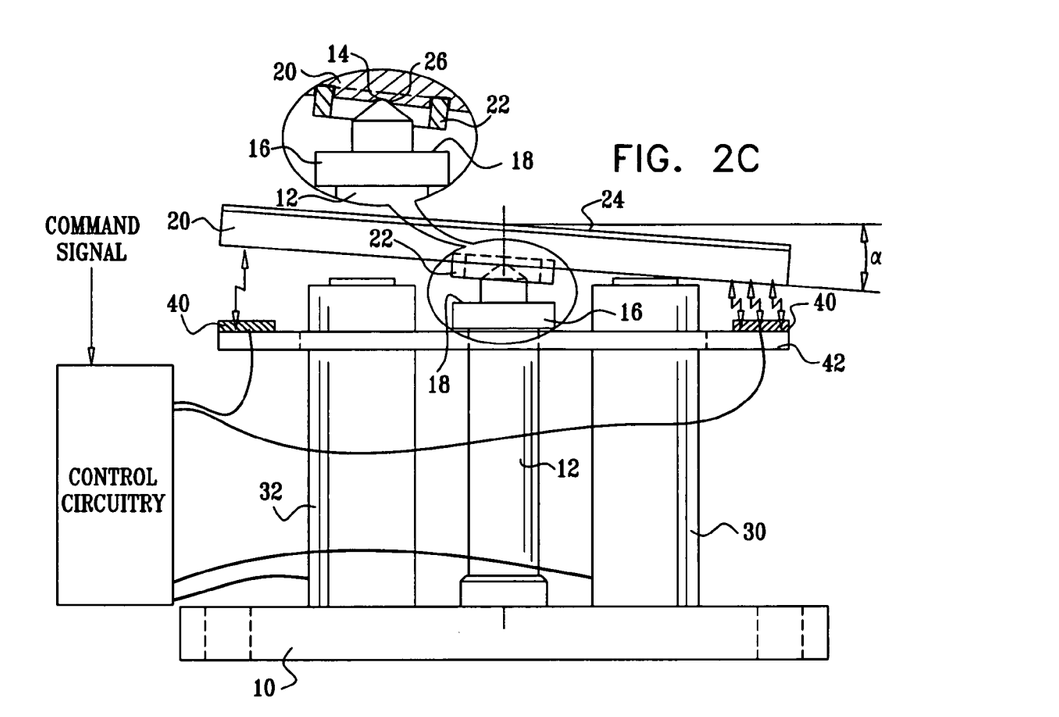

Reference is now made to FIG. 1, which is a simplified, partially cut-away pictorial illustration of a low-inertia tilting device constructed and operative in accordance with an embodiment of the present invention and to FIGS. 2A, 2B and 2C which are respective side view illustrations of the tilting device of FIG. 1 in respective intermediate orientation, first extreme orientation and second extreme orientation.

FIGS. 1-2C illustrate a tilting device, such as a three-dimensional positioner, typically comprising a base 10 onto which is mounted a central shaft 12 having a support point 14, which has a generally spherical configuration having a diameter of about 1.5 mm. An annular magnet 16 is mounted onto central shaft 12 and is positioned thereon such that a top surface 18 thereof is spaced vertically below the extreme end of support point 14. Magnet 16 is operative to apply an attractive magnetic force on an object to be positioned, such as a flat plate 20, which is suitably formed at least partially of a ferromagnetic material.

An additional magnet 22 which is typically mounted onto an underside of flat plate 20 and which in an embodiment of the invention is a ring-shaped magnet, is operative, when appropriately magnetized, to prevent the flat plate 20 from rotating about a longitudinal axis of shaft 12. Flat plate 20 suitably functions as a base for a mirror 24 and is formed with a central recess 26 for receiving support point 14 of shaft 12. Alternatively, flat plate 20 may have any other suitable function and may be part of an actuator or a positioner.

Spaced radially outwardly from support shaft 12 are a plurality of displacers, suitably electromagnets, which when actuated, attract flat plate 20. In the illustrated embodiment four such displacers 28, 30, 32 and 34 are provided and are generally uniformly spaced from each other, it being appreciated that a greater or lesser number and any suitable configuration of the displacers may alternatively be employed depending on the application. It is appreciated that a first axis 35 extends between displacers 30 and 34, and a second axis 36, which is not parallel and suitably perpendicular to the first axis 35, extends between displacers 28 and 32.

As seen most clearly from a consideration of FIGS. 2A-2C, the top surfaces of displacers 28, 30, 32 and 34 are spaced vertically below the support point 14 and thus below the bottom of plate 20, when it is in a generally horizontal orientation, as shown in FIG. 2A. The operation of displacers 28, 30, 32 and 34 is governed by control circuitry, which is designated by reference numerals 37 and 38 in FIG. 9 and is described in greater detail hereinbelow with reference to FIG. 9.

In accordance with an embodiment of the present invention, a plurality of propinquity sensors, suitably four capacitive sensors 40, are mounted on a support 42 which is parallel to base 10, vertically below flat plate 20 and radially outward with respect to the support point 14. Propinquity sensors 40 together provide an output indication of the three-dimensional orientation of plate 20 to the control circuitry, which serves as a feedback indication which assists the control circuitry in governing the operation of displacers 28, 30, 32 and 34. It is appreciated that the propinquity sensors 40 are azimuthally offset by approximately 45 degrees with respect to displacers 28, 30, 32 and 34. This offset is taken into account by the control circuitry when determining the three-dimensional positioning of flat plate 20.

FIGS. 2A, 2B and 2C are respective side view illustrations of the tilting device of FIG. 1 in respective intermediate, first extreme orientation and second extreme orientation. It is appreciated that the apparatus of FIGS. 1-2C is capable of positioning plate 20 at any three-dimensional position within the limits illustrated in FIGS. 2A-2C.

Figure 3:
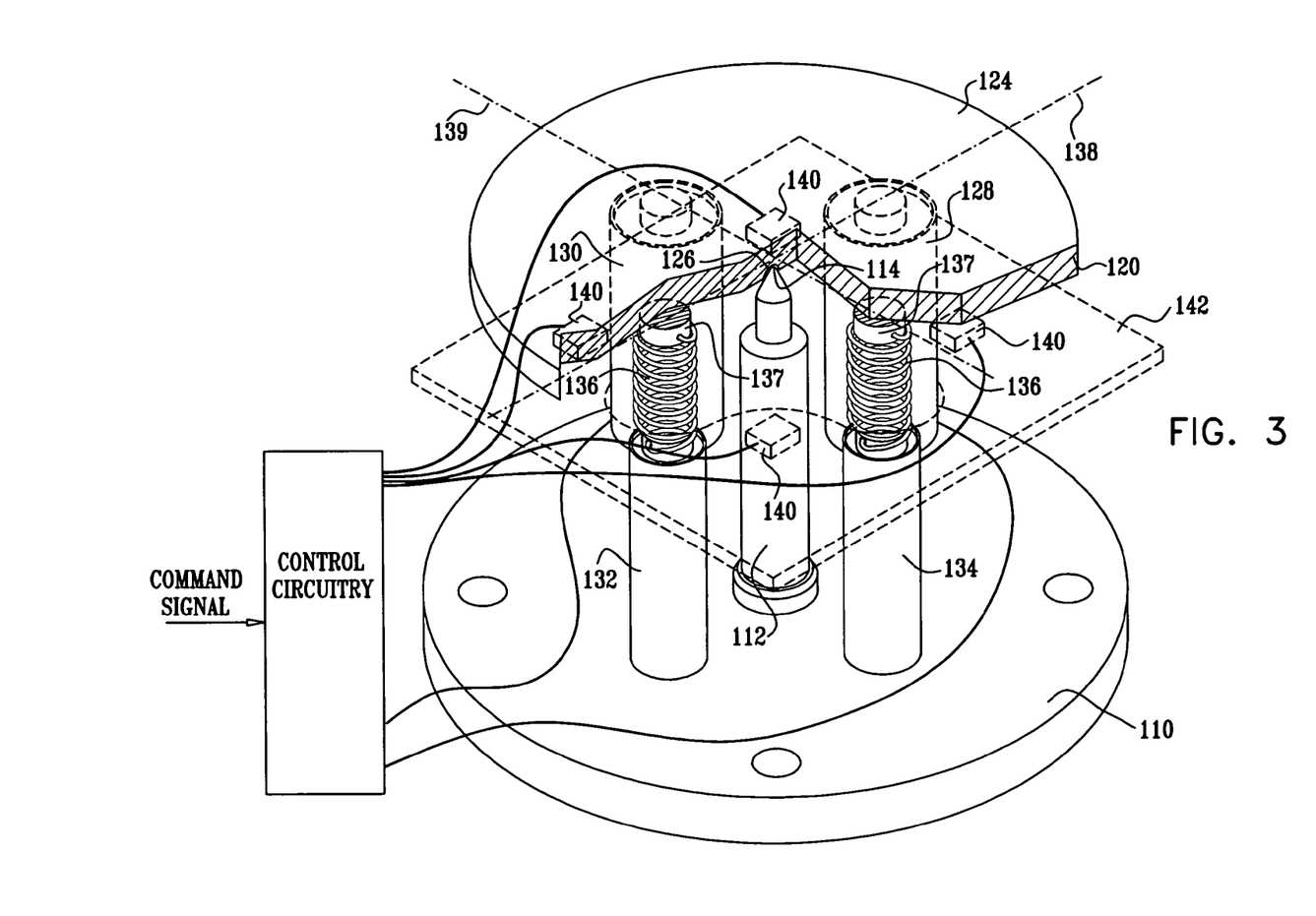
FIG. 3 is a simplified, partially cut-away pictorial illustration of a tilting device constructed and operative in accordance with another embodiment of the present invention.
Figure 4A:
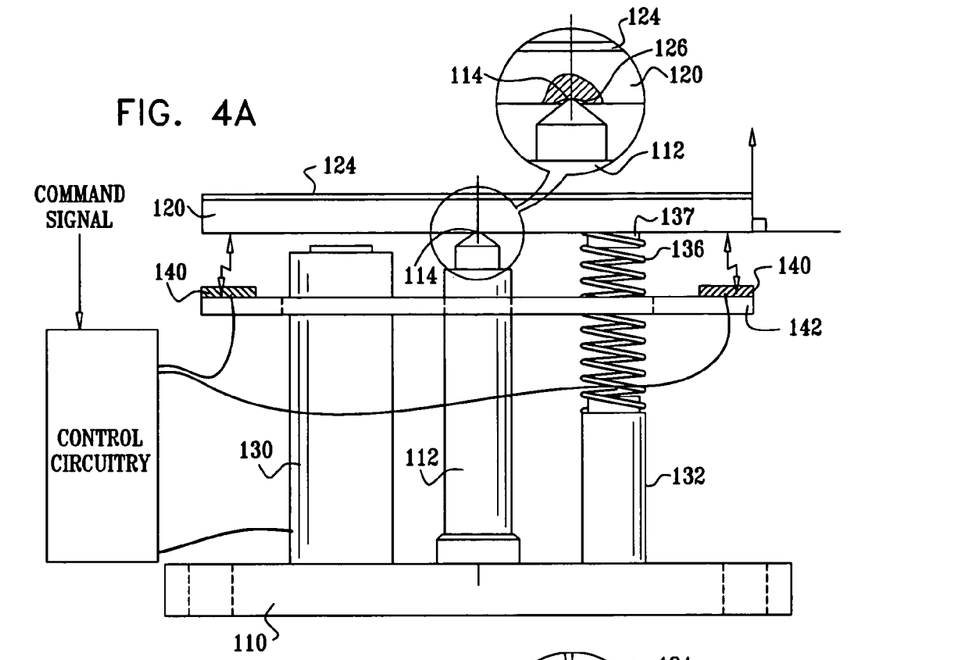
FIGS. 4A, 4B and 4C are respective side view illustrations of the tilting device of FIG. 3 in respective intermediate orientation, first extreme orientation and second extreme orientation.
Figure 4B:
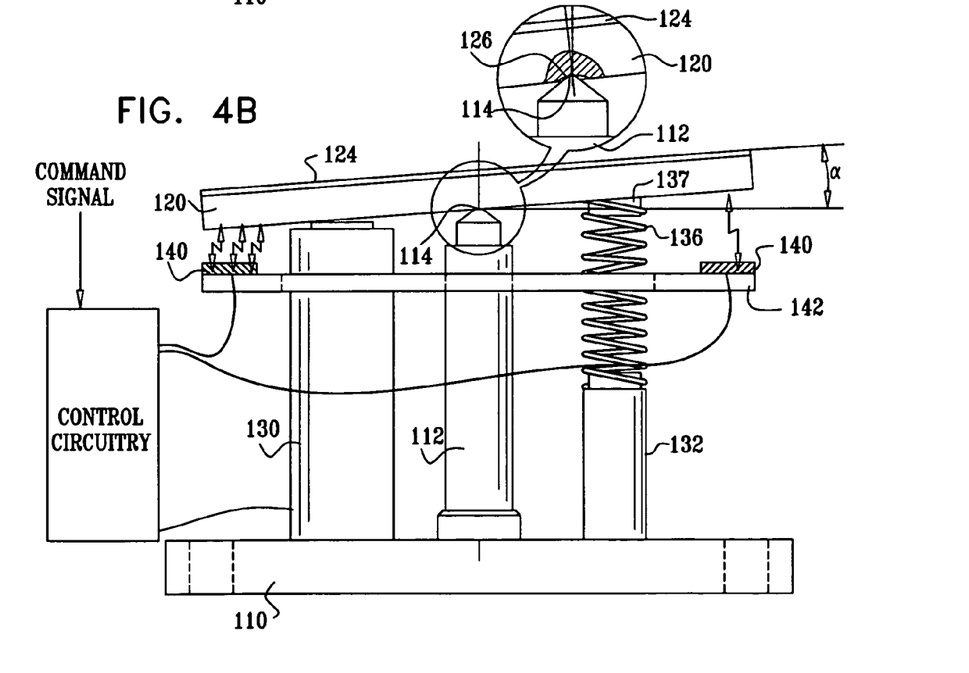
Figure 4C:
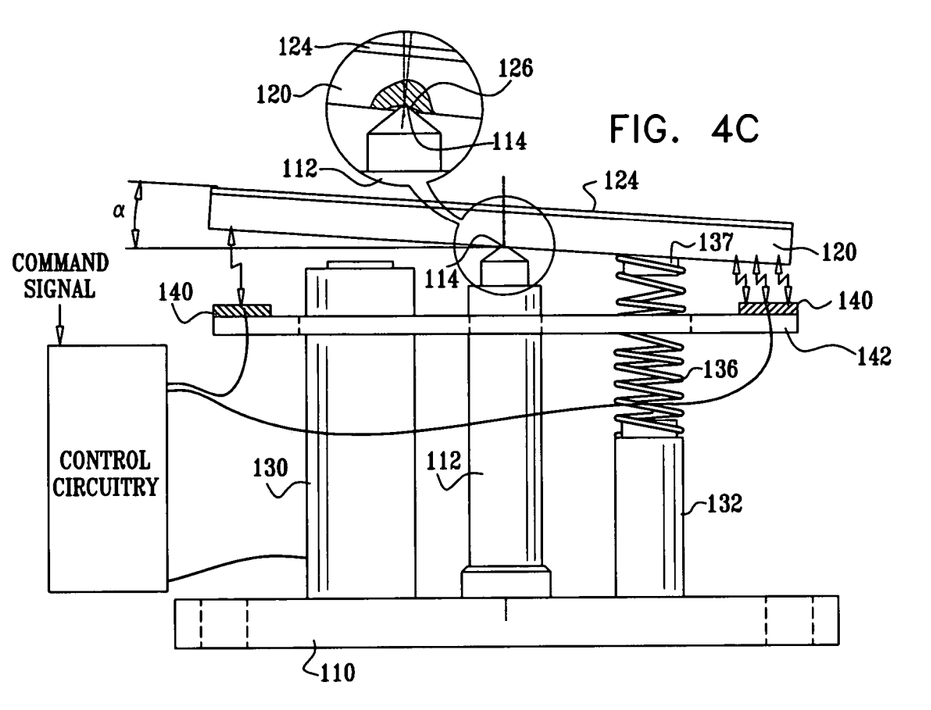

Reference is now made to FIG. 3, which is a simplified, partially cut-away pictorial illustration of a tilting device constructed and operative in accordance with another embodiment of the present invention and to FIGS. 4A, 4B and 4C which are respective side view illustrations of the tilting device of FIG. 3 in respective intermediate orientation, first extreme orientation and second extreme orientation.

FIGS. 3-4C illustrate a tilting device, such as a three-dimensional positioner, typically comprising a base 110 onto which is mounted a central shaft 112 having support point 114, suitably having a generally spherical configuration having a diameter of about 1.5 mm.

An object to be positioned, such as a flat plate 120, is suitably formed at least partially of a ferromagnetic material, functions as a base for a mirror 124 and is typically formed with a central recess 126 for receiving support point 114 of shaft 112. Alternatively flat plate 120 may have any other suitable function and may be part of an actuator or a positioner.

Spaced radially outwardly from support shaft 112 are a plurality of displacers including a pair of active displacers 128 and 130, which when actuated, attract plate 120, and a pair of passive displacers 132 and 134, which typically include springs. In the illustrated embodiment, the displacers are generally uniformly spaced from each other. It is appreciated that a greater or lesser number of passive and active displacers may be employed depending on the application.

Active displacers 128 and 130 comprise electromagnets, and passive displacers 132 and 134 are located respectively opposite displacers 128 and 130. Passive displacers 132 and 134 each include a tension coil spring 136 having a first end anchored, via an anchoring structure, to base 110 and a second end fixed, via an attachment disk 137, to an underside of plate 120. Passive displacers 132 and 134 provide a force which is directed oppositely to the force applied to flat plate 120 by the electromagnets 128 and 130. It is appreciated that a first axis 138 extends between displacers 130 and 134, and a second axis 139, which is not parallel and suitably perpendicular to first axis 138, extends between displacers 128 and 130

As seen most clearly from a consideration of FIGS. 4A-4C, the top surfaces of displacers 128 and 130 are spaced vertically below the support point 114 and thus below the bottom of plate 120, when it is in a generally horizontal orientation, as shown in FIG. 4A. The operation of electromagnets 128 and 130 is governed by control circuitry which is designated by reference numerals 37 and 38 in FIG. 9 and is described in greater detail hereinbelow with reference to FIG. 9.

In accordance with an embodiment of the present invention, a plurality of propinquity sensors, suitably four capacitive sensors 140, are mounted on a support 142 which is parallel to base 110, vertically below flat plate 120 and radially outward with respect to the support point 114. Propinquity sensors 140 together provide an output indication of the three-dimensional orientation of plate 120 to the control circuitry, which serves as a feedback indication which assists the control circuitry in governing the operation of displacers 128 and 130. It is appreciated that the propinquity sensors 140 are azimuthally offset by approximately 45 degrees with respect to displacers 128, 130, 132 and 134. This offset is taken into account by the control circuitry when determining the three-dimensional positioning of flat plate 120.

FIGS. 4A, 4B and 4C are respective side view illustrations of the tilting device of FIG. 3 in respective intermediate, first extreme orientation and second extreme orientation which is the equilibrium orientation.

In the orientation shown in FIG. 4A, the attractive force applied by the electromagnets 128 and 130 is equal to the force applied by springs 136, thereby maintaining the flat plate 120 in a horizontal, intermediate orientation, wherein the flat plate 120 is generally parallel to base 110.

In a first extreme orientation shown in FIG. 4B, the attractive force applied by the electromagnets 128 and 130 is greater than the force applied by springs 136, thereby causing springs 136 to extend, and tilting the flat plate 120 in a first direction with respect to base 110. It is appreciated that when the electromagnets 128 and 130 are not actuated, the springs 136 compress to their relaxed state, thereby causing flat plate 120 to be in its equilibrium orientation, shown in FIG. 4C.

It is appreciated that the apparatus of FIGS. 3-4C is capable of positioning plate 120 at any three dimensional position within the limits illustrated in FIGS. 4A-4C.

Figure 5:
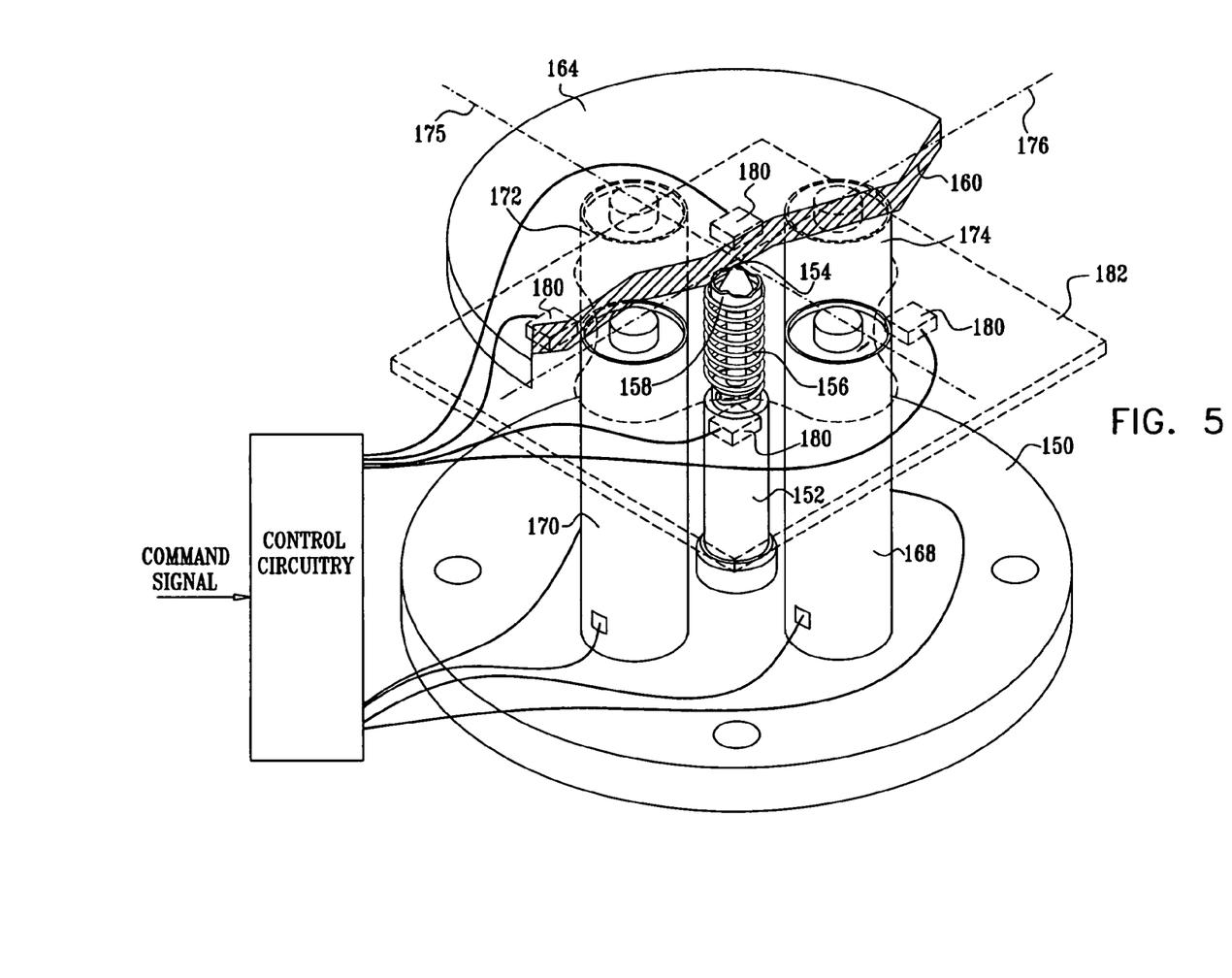
FIG. 5 is a simplified, partially cut-away pictorial illustration of a tilting device constructed and operative in accordance with yet another embodiment of the present invention.
Figure 6A:
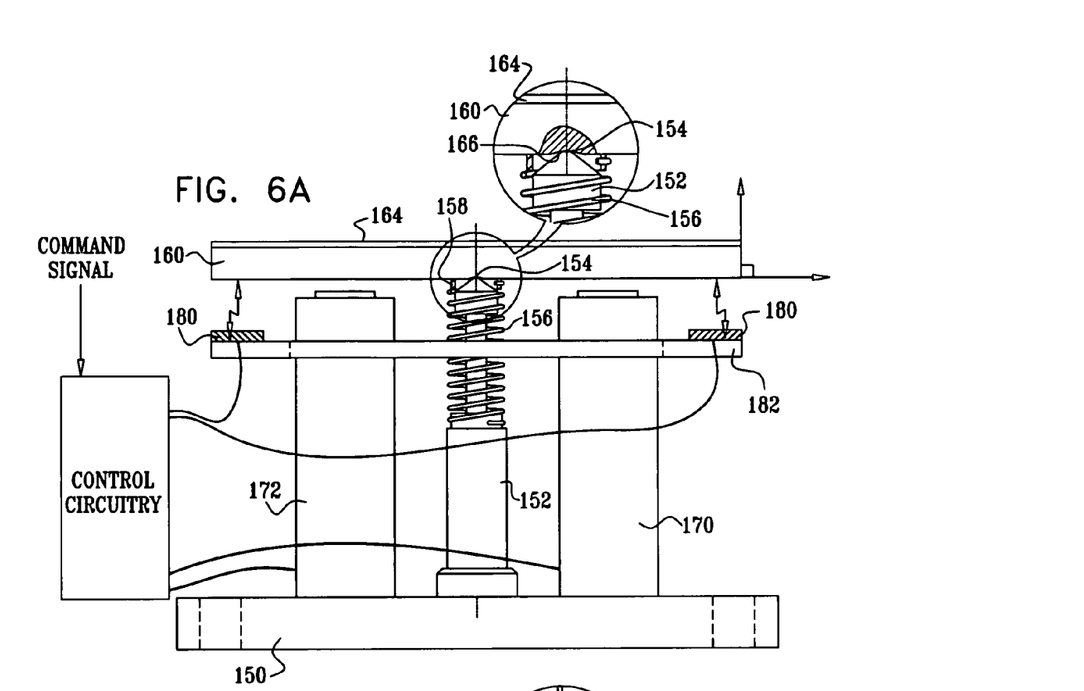
FIGS. 6A, 6B and 6C are respective side view illustrations of the tilting device of FIG. 5 in respective intermediate orientation, first extreme orientation and second extreme orientation.
Figure 6B:
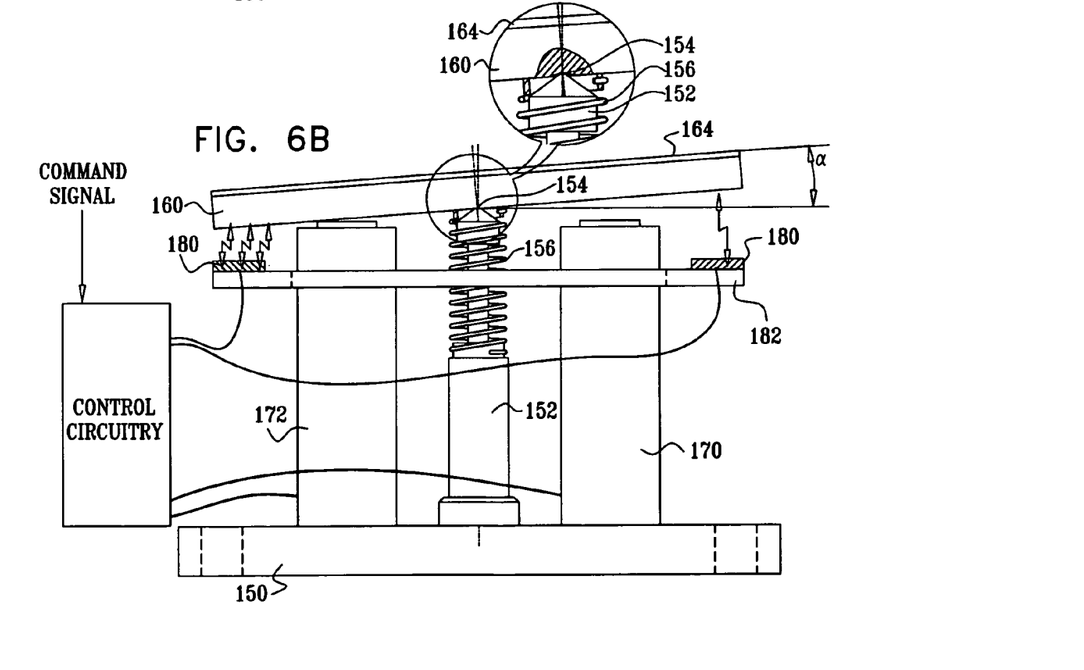
Figure 6C:
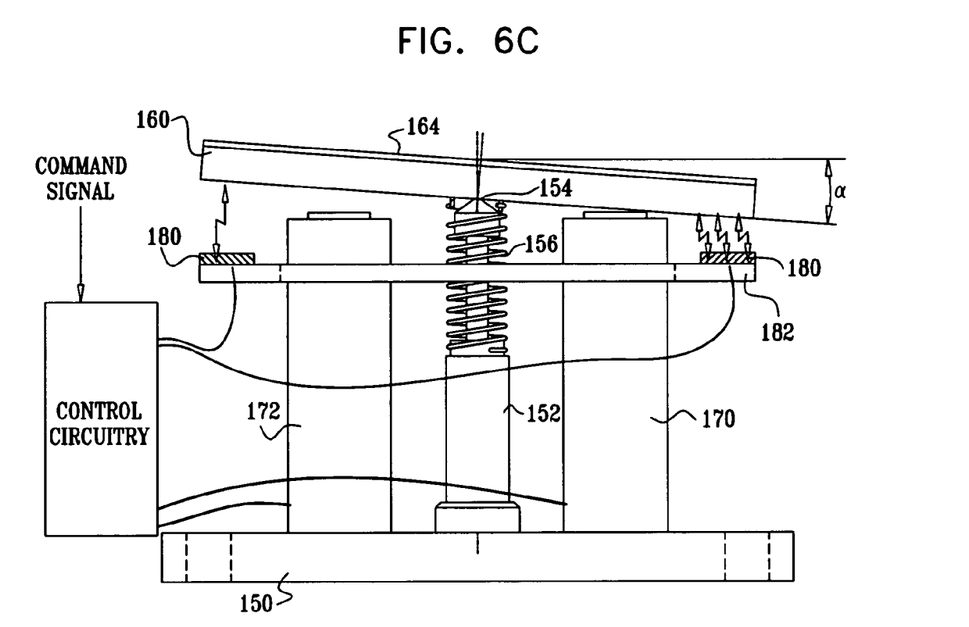

Reference is now made to FIG. 5, which is a simplified, partially cut-away pictorial illustration of a low-inertia tilting device constructed and operative in accordance with yet another embodiment of the present invention and to FIGS. 6A, 6B and 6C which are respective side view illustrations of the tilting device of FIG. 5 in respective intermediate orientation, first extreme orientation and second extreme orientation.

FIGS. 5-6C illustrate a tilting device, such as a three-dimensional positioner, typically comprising a base 150 onto which is mounted a central shaft 152 having a support point 154. In the embodiment seen in FIGS. 5-6C, support point 154 has a generally spherical configuration having a diameter of about 1.5 mm, although this need not be the case. A compression spring 156 is mounted around shaft 152, a bottom end of spring 156 being anchored to shaft 152 and a top end of spring 156 being anchored to an attachment disk 158. Attachment disk 158 is anchored to an underside of an object to be positioned, such as a flat plate 160, which is suitably formed of an at least partially of a ferromagnetic material. The anchoring of attachment disk 158 to flat plate 160 is operative to hold flat plate 160 in pivotal contact with shaft 152 and to prevent flat plate 160 from rotating about a longitudinal axis of shaft 152.

Flat plate 160 suitably functions as a base for a mirror 164 and is typically formed with a central recess 166 for receiving support point 154 of shaft 152. Central recess suitably is generally pyramidal in shape. Alternatively flat plate 160 may have any other suitable function and may be part of an actuator or a positioner.

Spaced radially outwardly from support shaft 152 are a plurality of displacers, suitably electromagnets, which when actuated, attract flat plate 160. In the illustrated embodiment four such displacers 168, 170, 172 and 174 are provided and are generally uniformly spaced from each other, it being appreciated that a greater or lesser number and any suitable configuration of the displacers may alternatively be employed depending on the application. It is appreciated that a first axis 175 extends between displacers 170 and 174, and a second axis 176, which is suitably not parallel and generally perpendicular to the first axis 175, extends between displacers 168 and 172.

As seen most clearly from a consideration of FIGS. 6A-6C, the top surfaces of displacers 168, 170, 172 and 174 are spaced vertically below the support point 154 and thus below the bottom of plate 160, when it is in a generally horizontal orientation, as shown in FIG. 6A. The operation of displacers 168, 170, 172 and 174 is governed by control circuitry, which is designated by reference numerals 37 and 38 in FIG. 9 and is described in greater detail hereinbelow with reference to FIG. 9.

In accordance with an embodiment of the present invention, a plurality of propinquity sensors, suitably four capacitive sensors 180, are mounted on a support 182 which is parallel to base 150, vertically below flat plate 160 and radially outward with respect to the support point 154. Propinquity sensors 180 together provide an output indication of the three-dimensional orientation of plate 160 to the control circuitry, which serves as a feedback indication which assists the control circuitry in governing the operation of displacers 168, 170, 172 and 174. It is appreciated that the propinquity sensors 180 are azimuthally offset by approximately 45 degrees with respect to displacers 168, 170, 172 and 174. This offset is taken into account by the control circuitry when determining the three-dimensional positioning of flat plate 160.

FIGS. 6A, 6B and 6C are respective side view illustrations of the tilting device of FIG. 5 in respective intermediate, first extreme orientation and second extreme orientation. It is appreciated that the apparatus of FIGS. 5-6C is capable of positioning plate 160 at any three-dimensional position within the limits illustrated in FIGS. 6A-6C.

Figure 7:
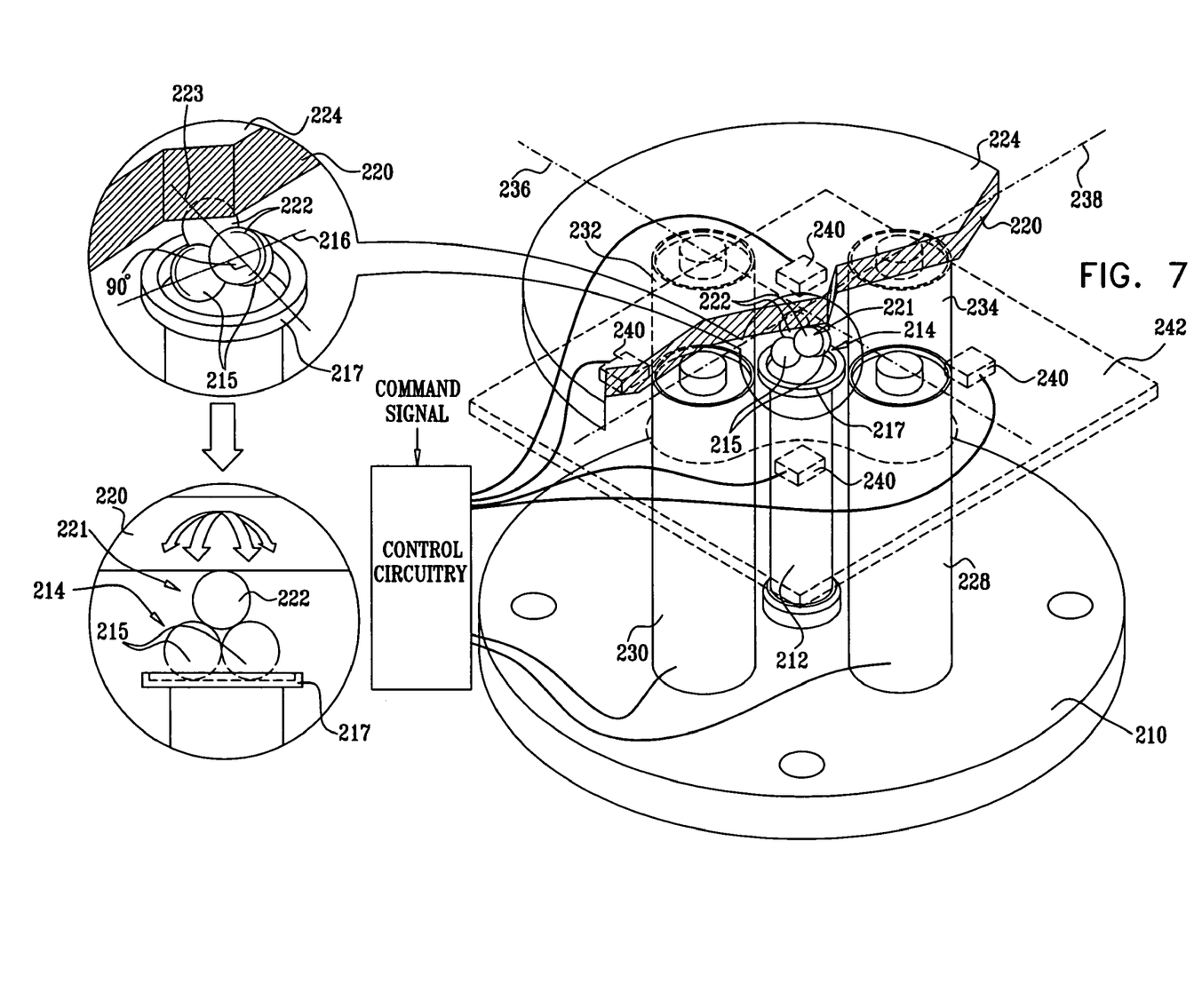
FIG. 7 is a simplified, partially cut-away pictorial illustration of a tilting device constructed and operative in accordance with still another embodiment of the present invention.

Reference is now made to FIG. 7, which illustrates a tilting device, such as a three-dimensional positioner, typically comprising a base 210, which is typically in a horizontal plane, onto which is mounted a central shaft 212. Mounted onto a top surface of central shaft 212 is a pivot support assembly 214, which in the embodiment seen, comprises a pair of spheres 215, suitably formed of tungsten carbide, which are arranged along a first axis 216 which is parallel to base 210. Spheres 215 are arranged in mutual touching arrangement, although this need not be the case.

An annular magnet 217 is mounted onto central shaft 212. Magnet 217 is operative to apply an attractive magnetic force on an object to be positioned, such as a flat plate 220, suitably formed at least partially of a ferromagnetic material. Mounted onto an underside surface of flat plate 220 is a pivot location assembly 221, which in the embodiment seen, comprises a pair of spheres 222, suitably formed of tungsten carbide, which are arranged along a second axis 223. Spheres 223 are arranged in mutual touching arrangement, although this need not be the case. Second axis 223 is perpendicular to first axis 216 and is parallel to the plane of plate 220.

The arrangement of spheres 215 and 222 along respective axes 216 and 223 tends to prevent the flat plate 220 from rotating about a longitudinal axis of shaft 212, which extends perpendicular to base 210. Flat plate 220 suitably functions as a base for a mirror 224. Alternatively flat plate 220 may have any other suitable function and may be part of an actuator or a positioner.

Spaced radially outwardly from support shaft 212 are a plurality of displacers, suitably electromagnets, which when actuated, attract flat plate 220. In the illustrated embodiment, four such displacers 228, 230, 232 and 234 are provided and are generally uniformally spaced from each other, it being appreciated that a greater or lesser number and alternative configurations may alternatively be employed depending on the application. It is appreciated that a first axis 236 extends between displacers 230 and 134, and a second axis 238, which is not parallel and suitably perpendicular to the first axis 236, extends between displacers 228 and 232. It is appreciated that axes 236 and 238 need not necessarily be related to axes 216 and 223.

Similarly to that shown and described hereinabove with reference to FIGS. 2A-2C, the top surfaces of displacers 228, 230, 232 and 234 are spaced vertically below the plate 220, when it is in a generally horizontal orientation. The operation of displacers 228, 230, 232 and 234 is governed by control circuitry similar to the control circuitry similar to the control circuitry designated by reference numerals 37 and 38 in FIG. 9 and is described in greater detail hereinbelow with reference to FIG. 9.

In accordance with an embodiment of the present invention, a plurality of propinquity sensors, suitably four capacitive sensors 240, are mounted on a support 242 which is parallel to base 210, vertically below flat plate 220 and radially outward with respect to support shaft 212. Propinquity sensors 240 together provide an output indication of the three-dimensional orientation of plate 220 to the control circuitry, which serves as a feedback indication which assists the control circuitry in governing the operation of displacers 228, 230, 232 and 234. It is appreciated that the propinquity sensors 240 are azimuthally offset by approximately 45 degrees with respect to displacers 228, 230, 232 and 234. This offset is taken into account by the control circuitry when determining the three-dimensional positioning of flat plate 220.

It is appreciated that the apparatus of FIG. 7 is capable of positioning plate 220 at any three dimensional position within predetermined limits which are defined at least partially by the heights and positioning of displacers 228, 230, 232 and 234.

Figure 8:
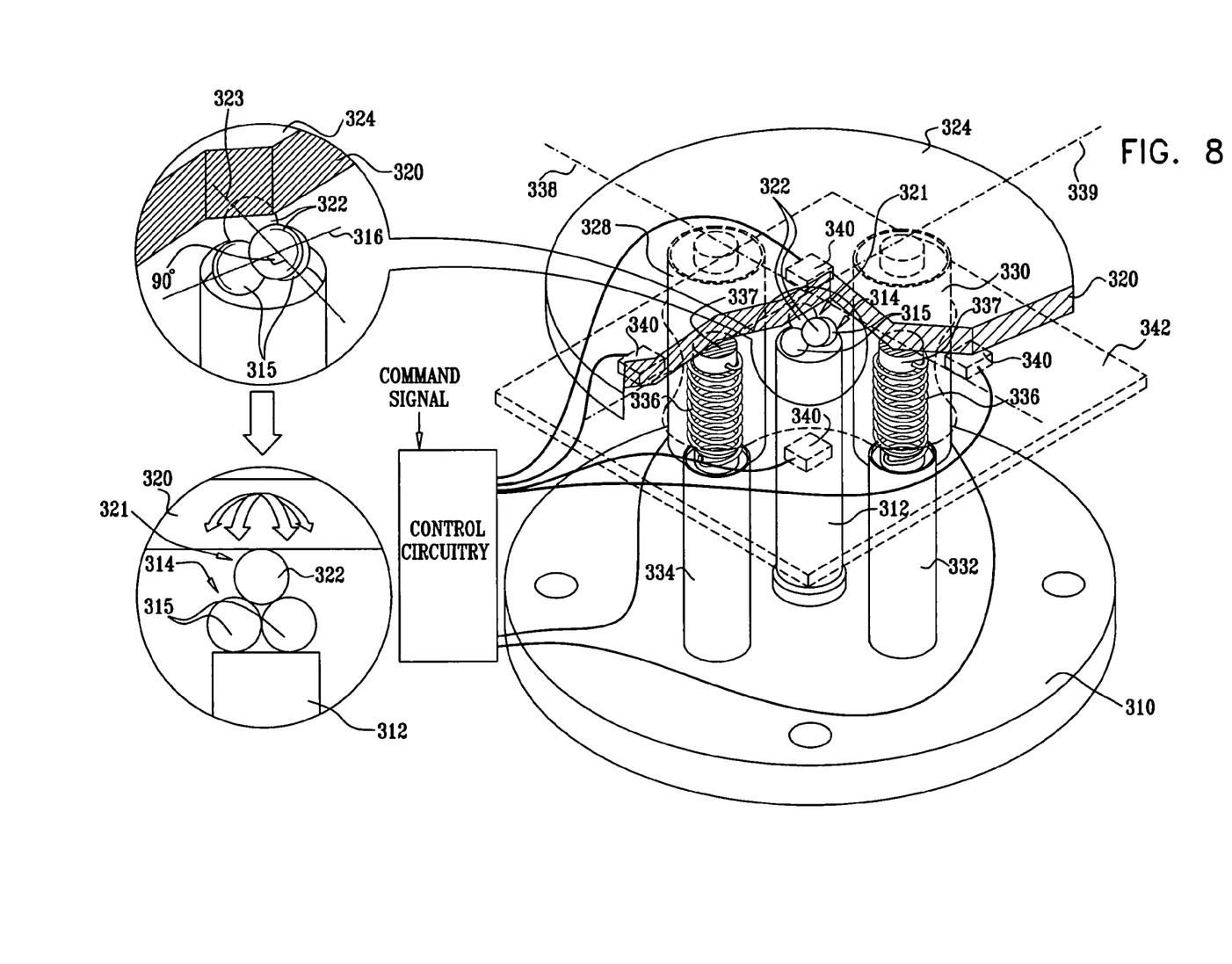
FIG. 8 is a simplified, partially cut-away pictorial illustration of a tilting device constructed and operative in accordance with a further embodiment of the present invention.

Reference is now made to FIG. 8, which illustrates a tilting device, such as a three-dimensional positioner, typically comprising a base 310, which is typically in a horizontal plane, onto which is suitably mounted a central shaft 312. Suitably mounted onto a top surface of central shaft 312 is a pivot support assembly 314, suitably comprising a pair of spheres 315, suitably formed of tungsten carbide, which are arranged along a first axis 316 which is parallel to base 310, suitably, but not necessarily, in mutual touching arrangement.

An object to be positioned, such as a flat plate 320, is formed at least partially of a ferromagnetic material and has mounted onto an underside surface thereof a pivot location assembly 321, suitably comprising a pair of spheres 322. Spheres 322 are suitably formed of tungsten carbide and are arranged along a second axis 323, suitably, but not necessarily, in mutual touching arrangement. Second axis 323 is perpendicular to first axis 316 and parallel to the plane of plate 320.

The arrangement of spheres 315 and 322 along respective axes 316 and 323 tends to prevent the flat plate 320 from rotating about a longitudinal axis of shaft 312, which extends perpendicular to base 310. Flat plate 320 suitably functions as a base for a mirror 324. Alternatively flat plate 320 may have any other suitable function and may be part of an actuator or a positioner.

Spaced radially outwardly from support shaft 312 are a plurality of displacers including a pair of active displacers 328 and 330, which when actuated, attract plate 320, and a pair of passive displacers 332 and 334, which typically include springs. In the illustrated embodiment, the displacers are generally uniformly spaced from each other, it being appreciated that alternative configurations and a greater or lesser number of active and passive displacers may alternatively be employed depending on the application.

Active displacers 328 and 330 comprise electromagnets, and passive displacers 332 and 334 are located respectively opposite displacers 328 and 330. Passive displacers 332 and 334 suitably include tension coil springs 336 having a first end anchored, via an anchoring structure, to base 310 and a second end fixed, via an attachment disk 337, to an underside of flat plate 320. Passive displacers 332 and 334 provide a force which is directed oppositely to the force applied to flat plate 320 by the electromagnets 328 and 330. It is appreciated that a first axis 338 extends between displacers 328 and 332, and a second axis 339, which is not parallel and suitably perpendicular to the first axis 338, extends between displacers 330 and 334. It is appreciated that axes 338 and 339 need not necessarily be related to axes 316 and 323.

Similarly to that shown and described hereinabove with reference to FIGS. 4A-4C, the top surfaces of displacers 328 and 330 are spaced vertically below the bottom of flat plate 320, when it is in a generally horizontal orientation. The operation of electromagnets 328 and 330 is governed by control circuitry similar to the control circuitry designated by reference numerals 37 and 38 in FIG. 9 and is described in greater detail hereinbelow with reference to FIG. 9.

In accordance with an embodiment of the present invention, a plurality of propinquity sensors, suitably four capacitive sensors 340, are mounted on a support 342 which is parallel to base 310, vertically below flat plate 320 and radially outward with respect to shaft 312. Propinquity sensors 340 together provide an output indication of the three-dimensional orientation of plate 320 to the control circuitry, which serves as a feedback indication which assists the control circuitry in governing the operation of displacers 328 and 330. It is appreciated that the propinquity sensors 340 are azimuthally offset by approximately 45 degrees with respect to displacers 328, 330, 332 and 334. This offset is taken into account by the control circuitry when determining the three-dimensional location of flat plate 320.

It is appreciated that the apparatus of FIG. 8 is capable of positioning plate 320 at any three dimensional position within predetermined limits which are defined at least partially by the heights and positioning of displacers 328, 330, 332 and 334.

Figure 9:
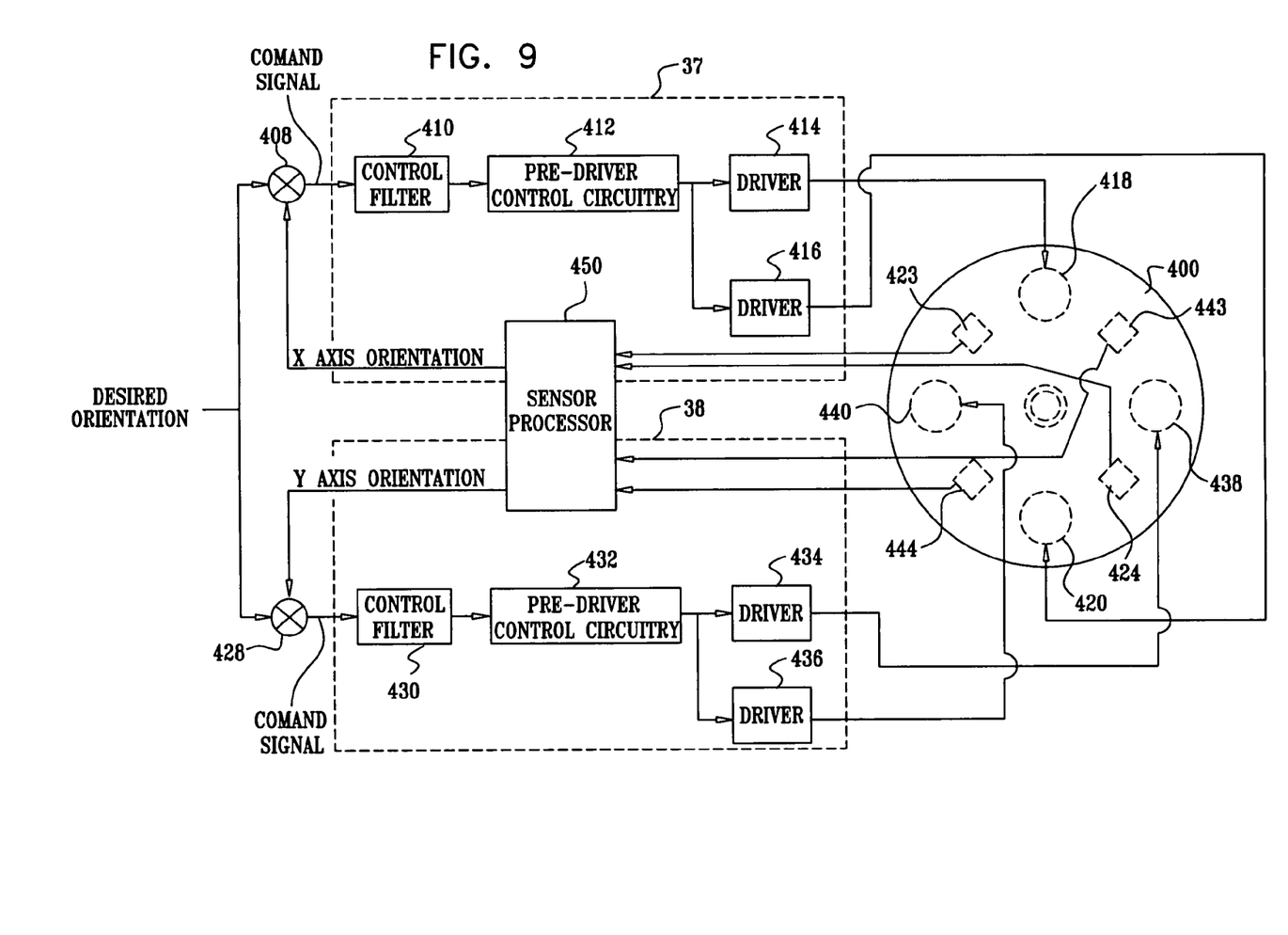
FIG. 9 is a simplified block diagram of the tilting devices of FIGS. 1-8 and of control circuitry used therein.

Reference is now made to FIG. 9, which is a simplified block diagram of the tilting devices of FIGS. 1-8 and of control circuitry used therein, such as the control circuitry shown in FIGS. 1-8, which is operative to control the operation of the tilting device of FIGS. 1-8.

As seen in FIG. 9, tilting of a positionable element 400, such as flat plates 20, 120, 220 and 320 (FIGS. 1-8), about a first axis, such as axis 36 (FIG. 1) which joins displacers 28 and 32 (FIG. 1), is controlled by a first control system 37, such as an X-axis control system, and tilting of the element 400 about a second axis, such as axis 35 (FIG. 1) which joins displacers 30 and 34 (FIG. 1), is controlled by a second control system 38, such as a Y-axis control system.

Control system 37 receives a command signal, for example and error signal, indicating a required orientation change of element 400 along the first axis. The command signal for the X-axis is provided by summation circuitry 408 which compares the X-axis portion of a desired orientation signal, provided by an external control system (not shown), with a sensed X-axis position of element 400, and calculates the difference between the sensed X-axis position of the element 400 and the desired X-axis position of the element to thereby indicate the required orientation change of element 400 along the first axis.

A first control filter 410 receives the command signal which it processes, for example by amplification, so that suitably small incremental changes in position of element 400 can be effected. The output of control filter 410 is provided as an input to first pre-driver control circuitry 412. The pre-driver control circuitry 412 calculates the power required by X-axis displacers 418 and 420, such as displacers 30 and 34 shown in FIG. 1, to effect a desired displacement of positionable element 400 along the X-axis. Pre-driver control circuitry 412 outputs signals to drivers 414 and 416 respectively indicating the respective power requirements required by X-axis displacers 418 and 420, and drivers 414 and 416 provide suitably amplified signals to these displacers to effect X-axis positioning of element 400.

In a similar manner, control system 38 receives a command signal, for example an error signal, indicating a required orientation change of element 400 along the second axis. The command signal command signal for the Y-axis is provided by summation circuitry 428 which compares the Y-axis portion of a desired orientation signal, provided by an external control system (not shown), with a sensed Y-axis position of element 400, and calculates the difference between the sensed Y-axis position of the element 400 and the desired Y-axis position of the element to thereby indicate the required orientation change of element 400 along the second axis.

A second control filter 430 receives the command signal which it processes, for example by amplification, so that suitably small incremental changes in position of element 400 can be effected. The output of control filter 430 is provided as an input to second pre-driver control circuitry 432. The pre-driver control circuitry 432 calculates the power required by Y-axis displacers 438 and 440, such as displacers 28 and 32 shown in FIG. 1, to effect a desired displacement of positionable element 400 along the Y-axis. Pre-driver control circuitry 432 outputs signals to drivers 434 and 436 respectively indicating the respective power requirements required by Y-axis displacers 438 and 440, and drivers 434 and 436 provide suitably amplified signals to these displacers to effect Y-axis positioning of element 400

At selected time intervals the position of element 400 is sensed by X-axis sensors 423 and 424, and by Y-axis sensors 443 and 444, for example by sensors 40 (FIG. 1-2C) and fed back to control circuitry 37 and 38. Outputs from these sensors are provided to a sensor processor 450 which calculates the respective X-axis and Y-axis orientation of element 400, taking into account a rotational orientation of sensors 423, 424, 443 and 444 with respect to their respective axes, as defined by corresponding displacers 418 and 420, 438 and 440. Sensor processor 450 outputs an X-axis orientation signal to first summation circuitry 408 which is used by control circuitry 37, and a Y-axis orientation signal to second summation circuitry 428 which is used by control circuitry 38. A control loop is thus closed for both X and Y axes.

It is appreciated that in the embodiments shown in FIG. 1-8, by position sensing and displacing element 400, such as flat plate 20, 120, 160, 220 and 320 in FIGS. 1-8, along two orthogonal axes, a multitude of orientations in three dimensional space may be effected. Furthermore, it is appreciated that in the embodiments shown in FIGS. 3-4C and 8, the control circuitry 38 only controls a single displacer, such as displacer 130 (FIG. 3), but receives feedback from a pair of sensors.

It will be apparent to persons skilled in the art that the present invention is not limited to what has been particularly shown and described hereinabove. Rather the scope of the present invention includes both combinations and subcombinations of features described and shown hereinabove as well as variations thereof which would occur to persons skilled in the art upon seeing the foregoing description and drawings and which are not in the prior art.

The invention claimed is:

1. A flat surface tilting device comprising:
   a selectably positionable flat surface element assembly having a flat surface element defining a flat surface and a pivot location portion, said pivot location portion being generally centered with respect to said flat surface;
   a pivot support element formed of a pair of spheres arranged along an axis;
   at least two electromagnets, fixed with respect to said pivot support element and arranged for application of magnetic force in a direction generally perpendicular to said flat surface thereby to pivot said flat surface element about said pivot support element;
   at least one sensor for sensing the position of said flat surface element; and
   feedback circuitry operative in response to at least one output of said at least one sensor to govern operation of said at least two electromagnets.

2. A flat surface tilting device according to claim 1 and wherein said pivot location portion comprises a recess in said flat surface element.

3. A flat surface tilting device according to claim 2 and also comprising a retaining magnet which is operative to retain said flat surface element in pivotable engagement with said pivot support element.

4. A flat surface tilting device according to claim 3 and wherein said retaining magnet comprises an annular magnet.

5. A flat surface tilting device according to claim 1 and also comprising a rotationally retaining magnet mounted onto an underside of said flat surface element.

6. A flat surface tilting device according to claim 5 and wherein said rotationally retaining magnet is magnetized in a manner which acts against rotation of said flat surface element about said at least one pivot.

7. A flat surface tilting device according to claim 5 and wherein said rotationally retaining magnet comprises a ring-shaped magnet.

8. A flat surface tilting device according to claim 1 and wherein said at least two electromagnets comprises a plurality of electromagnets symmetrically distributed with respect to said pivot location portion.

9. A flat surface tilting device according to claim 1 and wherein said at least one sensor comprises a capacitive sensor.

10. A flat surface tilting device according to claim 1 and wherein said feedback circuitry controls tilting of said flat surface element about a single axis, thereby effecting a two-dimensional position of said flat surface element.

11. A flat surface tilting device according to claim 1 and wherein said feedback circuitry controls tilting of said flat surface element about two axes, thereby effecting a three-dimensional position of said flat surface element.

12. A flat surface tilting device according to claim 1 and wherein said flat surface element comprises a base for a mirror element.

13. A flat surface tilting device according to claim 1 and wherein said feedback circuitry comprises first control circuitry operative to control positioning of said flat surface element about a first positioning axis, and second control circuitry operative to control positioning of said flat surface element about a second positioning axis which extends perpendicular to said first positioning axis.

14. A flat surface tilting device according to claim 1 and wherein said flat surface element is at least partially formed of a ferromagnetic material.

15. A flat surface tilting device according to claim 1 and wherein said at least one sensor is located below said flat surface element.

16. A flat surface tilting device according to claim 1 and wherein said feedback circuitry is operative to position said flat surface element by said operation of said at least two electromagnets.

17. A flat surface tilting device comprising:
- a selectably positionable flat surface element assembly including:
  - a flat surface element having a flat surface; and
  - a pivot location element including a first pair of spheres arranged along a first axis which extends parallel to said flat surface, said first pair of spheres being generally centered with respect to said flat surface;
- a pivot support element formed of a second pair of spheres arranged along a second axis which extends perpendicular to said first axis, said second pair of spheres pivotably engaging said first pair of spheres;
- at least two electromagnetic displacers arranged to apply a magnetic force to said flat surface so as to pivot said flat surface element about said pivot support element;
- at least one sensor for sensing the position of said flat surface element; and
- feedback circuitry operative in response to at least one output of said at least one sensor for governing operation of said at least two electromagnetic displacers.

18. A flat surface tilting device according to claim 17 and wherein said first pair of spheres are in mutual touching arrangement.

19. A flat surface tilting device according to claim 17 and wherein said second pair of spheres are in mutual touching arrangement.

20. A flat surface tilting device according to claim 17 and wherein at least one of said first pair of spheres and said second pair of spheres is formed of tungsten carbide.

* * * * *